UNITED STATES PATENT OFFICE.

AUGUSTE J. ROSSI, OF NIAGARA FALLS, NEW YORK, ASSIGNOR TO THE TITANIUM ALLOY MANUFACTURING COMPANY, OF NEW YORK, N. Y., A CORPORATION OF MAINE.

TITANIC-OXID CONCENTRATE AND METHOD FOR OBTAINING THE SAME.

1,272,855.  Specification of Letters Patent.  Patented July 16, 1918.

No Drawing.  Application filed November 27, 1917. Serial No. 204,139.

*To all whom it may concern:*

Be it known that I, AUGUSTE J. ROSSI, a citizen of the United States, and a resident of Niagara Falls, in the county of Niagara, and State of New York, have invented a certain new and useful Titanic-Oxid Concentrate and Method for Obtaining the Same, of which the following is a specification.

My present invention relates to the industrial separation and concentration of titanic oxid ($TiO_2$) from therewith associated undesired substances, and its objects comprise provision of procedures, comprising novel steps, whereby purity of the final product is enhanced, its obtainment accelerated, and its cost diminished.

Whiteness, fineness, softness, and smoothness have long been desiderata in such titanic oxid products, whether for use as pigments, as in paints, or otherwise. Numerous patents have been granted to myself and others for procedures, chemical, electrical, etc., aimed at excluding impurities, and thus imparting the desired qualities; but these, while highly useful and correspondingly in vogue, fail too often, under certain conditions, as regards desired simplicity, economy and effectiveness. For example, notwithstanding that thereby discoloration of such products attributable to presence therein of iron has been often, if not always, overcome, nevertheless there have persisted too frequently, and hitherto bafflingly, peculiar slight discolorations, which my more recent researches indicate to arise from presence of other than ferro impurities, *e. g.* nickel, chrome, copper, vanadic acid, etc., small, but not neglible, qantities of one, or, more, of which are detectable in some of the raw materials employed, for example, some of the titaniferous, or ilmenite ores, and which persist more or less throughout and notwithstanding the hitherto procedures referred to.

My present invention is based not only on the foregoing, but, also, and more importantly, on my further discovery that suitable additions of organic matter to the titanic solutions hitherto employed in obtainment of the desired titanic oxid products, not only accentuate and accelerate precipitation of the titanic compounds, thereby simplifying, and economizing in, the operation, but also, and as importantly, insure not only a lesser, but also a less noxious, precipitation of other substances than has been heretofore attained, my resulting precipitate consisting of either substantially pure, and useful for the purpose, compounds of titanium, or of these associated with derivaties of the solution which are undetrimental to the said qualities sought in the final product. In short, by aid of my present procedure, it becomes possible to eliminate except truly negligibly, not only the iron, but also other impurities, and this without resort to any of the above referred to, hitherto practised, and more difficult and costly procedures employed in hopes of obtaining such results. For example, I secure the desired precipitation of segregated titanic constituents of the solutions without resort to infusion of gases such as sulfurous dioxid, sulfureted hydrogen, etc. Moreover, the titanic products of my present invention, instead of being more or less undesirably gritty and granular, are exceptionally, if not unprecedently, uniformly smooth and so finely divided, or pulverulent, as to require none of the hitherto often practised grinding or other mechanical pulverizations. It is also to be noted that my titanic precipitate possesses excellent filtering qualities.

My present invention is practised and its resulting novel product obtained, as follows: First, I produce, from any titaniferous material, for example, titaniferous iron or ilmenite ores, a titanic solution, preferably a titanic sulfate solution, by any such now well known procedures as, for instance, are described in Letters Patents Nos. 1,196,030 and 1,196,031, granted to Louis E. Barton and me August 29, 1916. Then, to such crude solution, without need of any previous chemical, electrical, or other, treatment thereof, I add organic substances as precipitants. These organic additions may be either vegetal, as derived directly from leaves, bark, or other vegetable growths, or they may be animal, as resulting from digestion of the vegetal in the form of animal tissues, or as constituents of their secretions, urea for example. Such organic additions, one or more, are made in the form of ordinary water extracts obtained in any convenient manner, and their proportions are regulated so as to insure the greatest possible precipitation of titanic constituents of the solution as can, by those skilled in the art, be readily determined according to the requirements in any particular case. For example: I obtain excellent results by adding to 12.4 parts of a titanic sulfate solution, containing 1.16 parts of titanic oxid in solution, 50 parts of the organic water extract containing, say, 1.55 parts of organic matter, this being equivalent to say a 3.1% solution of the latter. Thereupon, I, preferably, heat the charge to the point of ebullition, or boiling, at which there is developed therein a notable, though temporary, foaming, this indicating, I believe, the critical temperature as regards desired character and pervasiveness of the reactions. Thereafter such heating, being continued, the said peculiar foaming subsides, and during the operation, beginning with the addition of the organic extract, titanic constituents of the solution fall down in the form of a readily and perfectly filtrable precipitate, the which being dehydrated, as by calcination, yields a final product containing from 95% to 97%, or even more, of $TiO_2$, the balance being mostly silica together with some soda salts, and phosphates containing constituents of organic origin, none of which are undesirable for pigment purposes, and the mass of which will, after being calcined, be found to be of the exceptional whiteness, fineness, smoothness, and pulverulent character, above referred to.

While I have also obtained precipitation of titanic constituents even without thus heating the charge, thereby demonstrating the property of organic vegetal, or even animal matters, to, at normal temperatures, precipitate titanic oxid from its acid solutions, it is to be noted that the resulting precipitate is not, in that case, usually sufficiently permanent for industrial purposes owing to the acidity of some solutions tending to redissolve the precipitate, and that, therefore, it is preferable, or necessary, in industrial operation, to, as above indicated, heat the charge during digestion, the degree and duration of which will of course, depend upon the conditions of, and the facilities available for the operation, as, for example, the degree of concentration of the water extract of the organic matter, etc. I have, for another example, obtained good results by operating as follows, using in this instance a titanic sulfate solution of specific gravity 1.38 such as is described in Letters Patent No. 1,205,144, granted to Louis E. Barton November 21, 1916, and this without any treatment thereof to insure reduction of the iron, etc.: To 100 c. c. of such solution, containing 12.7 grams $TiO_2$ in solution, I added 400 c. c. of the solution of organic extracts containing 13.5 grams vegetal matter (in this instance derived from 78 grams of dried leaves) and 2.24 grams mineral matter. The volume of the charge, during digestion for about two hours at just boiling, was maintained at 500 c. c. This operation yielded 11 grams of calcined product, 10.3 grams, i. e. 93.7% of which was $TiO_2$—this being equivalent to recovery of 81.1% of the $TiO_2$. The calcined products resulting from this operation contained substantially no more than traces of iron, was pure white in color, and possessed all the other desirable qualities heretofore referred to.

My present invention is also useful in production of composite pigment products containing the $TiO_2$ thereby derived in association with other substances sometimes desired as constituents of pigments. For example, to the crude titanic sulfate solution, containing the thereto added extract of organic substances, I add an alkaline substance, or base capable of producing an insoluble sulfate, preferably in the form of caustic lime, or milk of lime, (though calcium carbonate can also be used), in quantity sufficient to nearly, but not quite, neutralize the excess of sulfuric acid in the charge, and then, on heating the charge as before stated, and, preferably, also additionally stirring it, I thus obtain a coprecipitation of titanic and calcic constituents, the which precipitates on being dehydrated, as by calcination, yield a composite pigment product composed essentially of titanic oxid and calcium sulfate and characterized by its exceptional softness, smoothness and whiteness, and as requiring little, or no, mechanical pulverization to adapt it for pigment purposes.

I have tested no less than thirty-six different organic substances, water extracts of which have been successfully employed by me in operations as per my invention above described.

The preparation of the water extracts will be understood by those skilled in the art. For an example, I prepared an effective extract as follows: Fallen leaves were gathered and dried in a lead lined, steam heated, kettle. Their weight, before drying, was 11 pounds, 4.5 ounces. Weight, after drying, 7.5 pounds. Of these 28.5 ounces (808 grams) where boiled with 10 quarts of water for four hours, screened through three layers of cheese cloth and washed three times by adding three quarts of hot water, for each wash, to the leaves in the kettle after draining for one-half to three-quarters of an hour after each washing. The solution (19 quarts) was then concentrated to 4100 c. c. Its density was 1.01 at 23° C.

Having now described my invention, what I claim as new and desire to secure by Letters Patent is the following, viz:

1. In the separation of a titanic compound from a titanic solution, the step which consists in adding organic matter to the solution.

2. In the separation of a titanic compound from a titanic solution, the steps which consist in adding thereto organic matter, and nearly neutralizing the acidity of the solution.

3. In the separation of a titanic compound from a titanic solution, the steps which consist in adding thereto organic matter, nearly neutralizing the acidity of the solution, and heating, or boiling the charge.

4. In the separation of a titanic compound from a titanic solution, the steps which consist in adding thereto organic matter, nearly neutralizing the acidity of the solution, heating, or boiling, the charge, and meanwhile agitating it.

5. In obtaining titanic oxid from a titanic sulfate solution, the steps which consist in adding to the solution an extract of an organic substance, also an alkaline substance in quantity sufficient to nearly neutralize excess of sulfuric acid, boiling the charge, separating therefrom the resulting composite precipitate, and dehydrating it.

6. In obtaining titanic oxid from a titanic sulfate solution, the steps which consist in adding to the solution an extract of vegetable matter, also a compound of calcium in quantity sufficient to nearly neutralize excess of sulfuric acid, boiling the charge and separating therefrom the resulting composite precipitate, and dehydrating it.

7. The new article of manufacture distinguished as consisting essentially of titanic oxid ($TiO_2$), as being a white, extremely soft, smooth powder and as containing constituents of organic origin.

AUGUSTE J. ROSSI.

Witnesses:
LOUIS E. BARTON,
C. J. KINZIE.